Feb. 12, 1952 A. D. HOOKS 2,585,246
PROTECTIVE MEANS TO PREVENT DOUBLE
EXPOSURE OF FILM MAGAZINES
Filed Nov. 18, 1949
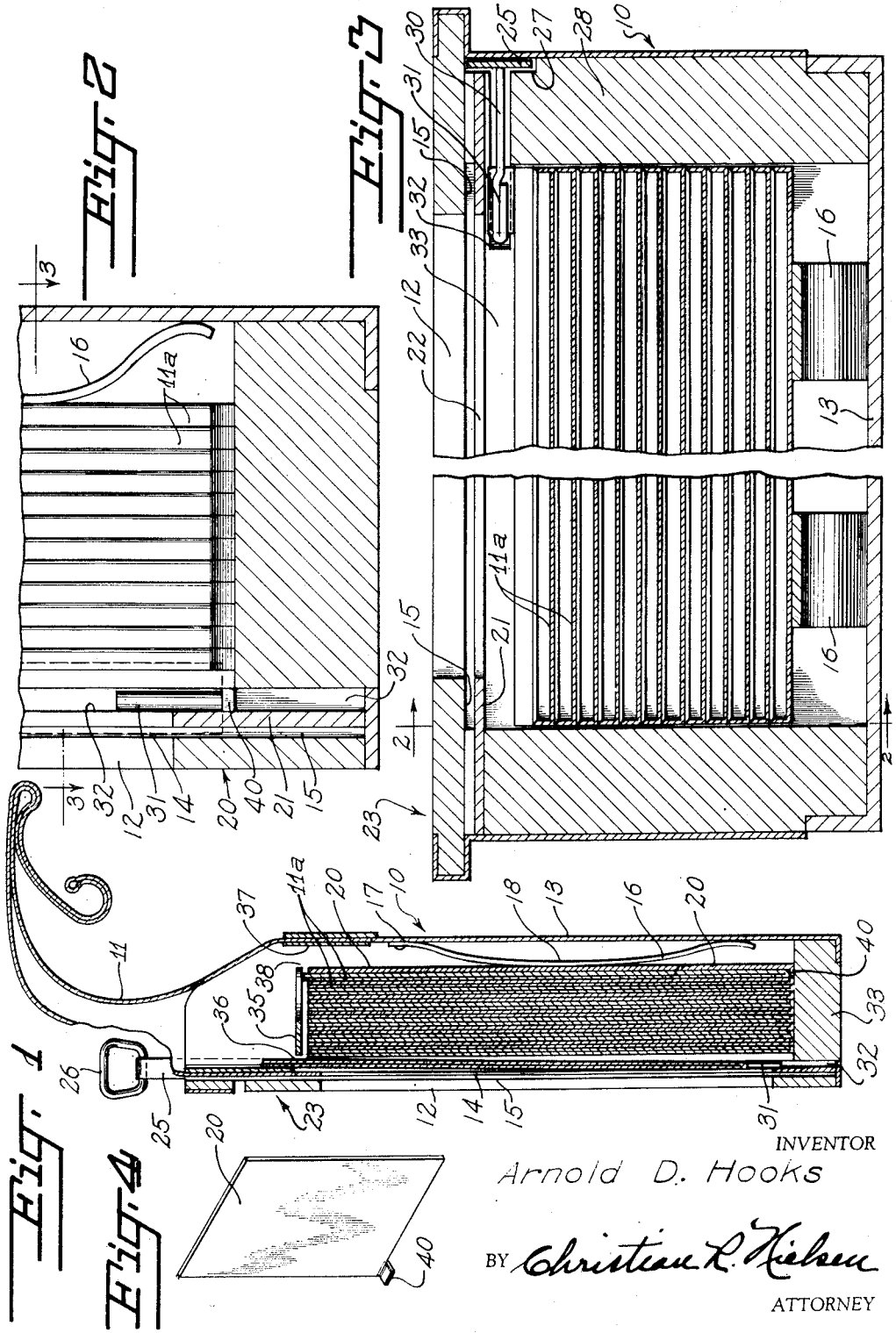
INVENTOR
Arnold D. Hooks
BY Christian L. Nielsen
ATTORNEY Patented Feb. 12, 1952

2,585,246

UNITED STATES PATENT OFFICE 2,585,246

PROTECTIVE MEANS TO PREVENT DOUBLE EXPOSURE OF FILM MAGAZINES

Arnold D. Hooks, Washington, D. C.

Application November 18, 1949, Serial No. 128,079

1 Claim. (Cl. 95—30)

This invention relates to cut film packs and is more particularly directed to a device within a film magazine to prevent double exposures of the films.

An object of the invention is the provison of a magazine for housing a determined number of films carried by sheaths in which the sheaths and contained films are adapted to be transferred from the front of the magazine to the rear thereof in sequence, after they have been exposed, a collapsible bag or other container being sealed to the upper open end of the magazine cooperating to facilitate the exchange in positions of the films without exposure to light rays, means being employed in the magazine to prevent further exchange of the films from the front to the rear of said magazine after all of the films have been exposed.

Another object of the invention is the provision of a plate and a connected lug shiftable consecutively and by increments from the rear of a film holding magazine to the front thereof as the films in sheaths are transferred from the front of the magazine to the rear thereof after each exposure, the transfer being made by a reciprocating rod having a foot for engaging the bottom edges of the sheaths and for raising the sheaths into a sealed compartment from whence they are deposited at the rear of the plate while moving the plate forwardly, until said plate reaches the extreme forward position in the magazine, the lug on the plate preventing the foot from being lowered sufficiently to engage beneath the plate to raise the same, thereby notifying the operator of the camera that all films have been exposed.

A further object of the invention is the provision of a means in a magazine supplied with a series of films contained in individual sheaths for preventing re-exposure of the films after all of the films have been exposed, said means being shifted to an operative position by the consecutive transfer of the films after exposure.

This invention is best understood from a consideration of the following detailed description taken in connection with the accompanying drawing forming part of the specification, nevertheless, it must be borne in mind that the invention is not confined to the disclosure, but is susceptible of such changes and modifications as shall define no material departure from the salient features of the invention as expressed in the appended claim.

In the drawings:

Figure 1 is a transverse vertical section of a magazine showing my invention applied thereto.

Figure 2 is an enlarged fragmentary vertical section of the lower end of the magazine showing my device in an operative position to prevent re-exposure of the films, taken along the line 2—2 of Figure 3.

Figure 3 is an enlarged horizontal section taken along the line 3—3 of Figure 2, and Figure 4 is a reduced perspective view of my device for preventing re-exposure of the films.

Referring more particularly to the drawing, 10 designates a housing of a magazine for cut films. This magazine is illustrated and described in United States Patent No. 1,431,908 dated October 10, 1922, and issued to William Folmer. The housing includes a collapsible bag 11 opening into the open upper end of the housing for shifting films in their sheaths 11a from an opening 12 at the inner face of the magazine to the rear, adjacent a removable back 13 while protecting the films from exposure to light rays. The opening 12 is closed normally by an opaque slide 14 which is raised and lowered manually for respectively exposing a film or for sealing the housing against light rays. The slide operates in the usual tracks 15.

The back 13 is removed to provide a rear entrance for packing the films and the encompassing sheaths 11a in an orderly arrangement in the magazine. Flat springs 16 have an end 17 secured to the inner face of the back. The other end of each spring slides freely on the inner face of said back. The bowed intermediate portions 18 of the springs press against a plate 20 for forcing the pack of film-equipped sheaths against the inner face of a metal frame 21 having an opening 22 in line with the opening 12 of a frame 23 at its inner face of the housing. The spaced frames 21 and 23 form the tracks 15 for the slide 14.

A reciprocating rod 25 provided with an external fingerpiece 26 is movable in a vertical slot 27 formed in a side wall 28 of the housing. A second vertical slot 29 in said side wall opens into the slot 27 to receive and guide a laterally projecting arm 30 rigid with the lower end of the flat rod 25. A foot 31 on the outer free end of the arm seats normally in a pocket 32 in the bottom 33 of the housing and below said bottom so that said foot will engage the lower end of the forwardly positioned sheath 11a for elevating said sheath and enclosed film after an exposure has been made, for placing the sheath and film in the collapsible bag 11.

A top plate 35 (Figure 2) has its front edge spaced from the top of the frame 21 to provide a slot 36 through which the sheath or septums 11a are drawn by the foot 31 when said sheaths are moved into the collapsible bag 11. The rear edge of the plate is spaced from a rear transverse bar 37 which retains the upper end of the removable back 13 in place to provide an entrance 38 for returning the exposed films and their supporting sheaths to the rear of the pack and also to the rear of the plate 20.

After a sheath-contained film has been removed from the front of the pack and after its confined film has been exposed, said sheath is received by the bag 11 through the opening 36. The operator manipulates the sheath in the flexible bag until the lower end is received by the entrance 38. Downward pressure on the upper end of the sheath will cause said sheath to move downwardly between the plate 20 and the bowed portions 18 of the springs 16 until the lower ends of said sheaths will rest on the bottom 33 of the housing. Each sheathed film after exposure is shifted to the rear in an orderly arrangement as previously described until all of the films have been exposed.

The plate 20 which has the same dimensions as the sheaths provides a means for preventing the series of the sheath-encased films in the magazine from being exposed again. The plate is manufactured from a metal sheet, preferably aluminum, but it may be made also from plastic. A lip or lug 40 projects laterally from the lower end of the plate and at a point thereon where the foot 31 moves in a vertical line. In other words, as shown in Figure 2, the arrangement is such that the lip or lug is placed over the pocket 32 when the plate has been shifted to the front of the magazine when all of the films have been exposed and transferred in their sheaths consecutively to the rear of the plate 20.

The operation of my device is as follows: All of the parts described above, except the plate 20 and the lip or lug 40 are shown in the patent referred to above. In this patented construction, as each film is exposed, it is removed by raising the rod 25 when the forwardly positioned sheath and supported film are elevated into the collapsible bag or other enclosure 11 and thence transferred to the rear of the magazine by manipulating the sheath until it passes through the opening 38 and rests upon the bottom 33 of the magazine, the springs 16 exerting pressure on the pack at all times to maintain the inwardly disposed sheath in contact with the frame 21. Continued transfer of the exposed films from the front of the magazine to the rear will exhaust the unexposed films. However, miscalculation of the operator of the camera, may cause one or more of the films to be re-exposed, although a hinged door (not shown) is employed normally for inspecting numbers applied to the rear faces of the sheaths.

The plate 20, after all of the films have been exposed and transferred to the rear of the magazine, will have been moved into flat contact with the rear face of the frame 21. At this time the lug 40 will be disposed over the pocket 32 (Fig. 2). Any attempt of the operator to elevate a film and its containing sheath will be prevented since the foot 31 which raises the sheaths will be restrained from further downward movement by the lug 40. Thus, the plate 20 or the juxta-positioned sheath element cannot be moved. The operator will recognize the fact that the limit of exposures has been reached.

While I have used the terms film, sheath or film equipped sheath, it will be appreciated that the sensitized photographic plates may be substituted for the sheaths equipped with films. Therefore, the use of the expressions in the specification and claim is intended to include a sensitized photographic plate or film.

I claim:

In a magazine plate holder of the type in which each exposed plate of a pack of photographic plates housed in the magazine is elevated into a container by a foot on a reciprocated rod when said foot engages beneath the lower edge of the newly exposed plate, said plate being transferred to the rear of the pack, a non-sensitized plate of the same dimensions as the photographic plates disposed at the rear of the pack, a lug projecting laterally from the lower end of said plate which is shifted progressively forwardly by the transferred exposed plates until the non-sensitized plate has reached the front of the magazine, the bottom of the magazine having a pocket into which the foot moves for placing the foot below the lower edges of all of the plates, the lug being in line with the upper end of the pocket so that when the non-sensitized plate reaches the photographic position in the magazine, the lug will rest over the pocket and prevent operation of the foot for raising the plates.

ARNOLD D. HOOKS.

REFERENCES CITED

The following references are of record in the file of this patent:

UNITED STATES PATENTS

| Number | Name | Date |
|---|---|---|
| 638,300 | Trumbull | Dec. 5, 1899 |